(12) United States Patent
Huang et al.

(10) Patent No.: US 9,360,973 B2
(45) Date of Patent: Jun. 7, 2016

(54) METHOD AND APPARATUS FOR DETERMINING TOUCH POINT COORDINATES ON A TOUCH PANEL WITH ANISOTROPIC FILMS

(71) Applicant: TIANJIN FUNAYUANCHUANG TECHNOLOGY CO., LTD., Tianjin (CN)

(72) Inventors: Chun-Lung Huang, New Taipei (TW); Chien-Yung Cheng, New Taipei (TW); Po-Sheng Shih, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 241 days.

(21) Appl. No.: 13/927,381

(22) Filed: Jun. 26, 2013

(65) Prior Publication Data

US 2015/0002440 A1 Jan. 1, 2015

(51) Int. Cl.
*G06F 3/041* (2006.01)
*G06F 3/044* (2006.01)

(52) U.S. Cl.
CPC .................................. *G06F 3/044* (2013.01)

(58) Field of Classification Search
None
See application file for complete search history.

(56) References Cited

U.S. PATENT DOCUMENTS

| | | | |
|---|---|---|---|
| 2005/0041018 A1* | 2/2005 | Philipp | 345/178 |
| 2008/0296073 A1* | 12/2008 | McDermid | 178/18.05 |
| 2009/0267914 A1* | 10/2009 | Dews et al. | 345/173 |
| 2011/0007010 A1* | 1/2011 | Chen et al. | 345/173 |
| 2011/0216035 A1* | 9/2011 | Shih et al. | 345/174 |
| 2013/0141382 A1* | 6/2013 | Simmons et al. | 345/174 |

* cited by examiner

*Primary Examiner* — Alexander Eisen
*Assistant Examiner* — Kebede Teshome
(74) *Attorney, Agent, or Firm* — Novak Druce Connolly Bove + Quigg LLP (57) ABSTRACT

A method for determining touch point coordinates on a touch panel comprises following steps. A touch panel with a transparent conductive layer is provided, the transparent conductive layer comprises a first direction X having relative low impedance, and a second direction Y having a relative high impedance; a number of first conductive terminals P1 and a number of second conductive terminals P2 opposite the first conductive terminals P1, are electrically connected to the transparent conductive layer, spaced from each other, and arranged along the X direction. At least two adjacent first conductive terminals P1, at least two adjacent second conductive terminals P2, or one of the first conductive terminals P1 and opposite one of the second conductive terminals P2 are simultaneously driven. A number of signals are obtained. The touch point coordinates are obtained by comparing the strengths of the plurality of signals.

12 Claims, 13 Drawing Sheets

METHOD AND APPARATUS FOR DETERMINING TOUCH POINT COORDINATES ON A TOUCH PANEL WITH ANISOTROPIC FILMS

BACKGROUND

1. Technical Field

The present disclosure relates to a method and apparatus for determining touch point coordinates on a touch panel with anisotropic films.

2. Description of Related Art

Touch panels or touch screens are widely applied in electronic apparatuses, particularly in portable or hand-held electronic apparatuses, such as personal digital assistants (PDA) or mobile phones. Touch panels involve integration of resistive-type, capacitive-type or optical touch technologies and display panels.

A conventional capacitive-type touch panel includes two patterned layers made of transparent conductive materials formed on two surfaces of a glass substrate to detect two-dimensional coordinates on the patterned layers. The transparent conductive material of conventional touch panel is indium tin oxide (ITO). Recently, the research has been focusing on applying carbon nanotube films as the transparent conductive material, and the carbon nanotube films include carbon nanotubes parallel with each other. However, due to the anisotropic impedance of the carbon nanotube film, the resolution to determine the touch points along the direction parallel with the carbon nanotubes is low.

What is needed, therefore, is to provide an apparatus and a method for solving the problems as discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
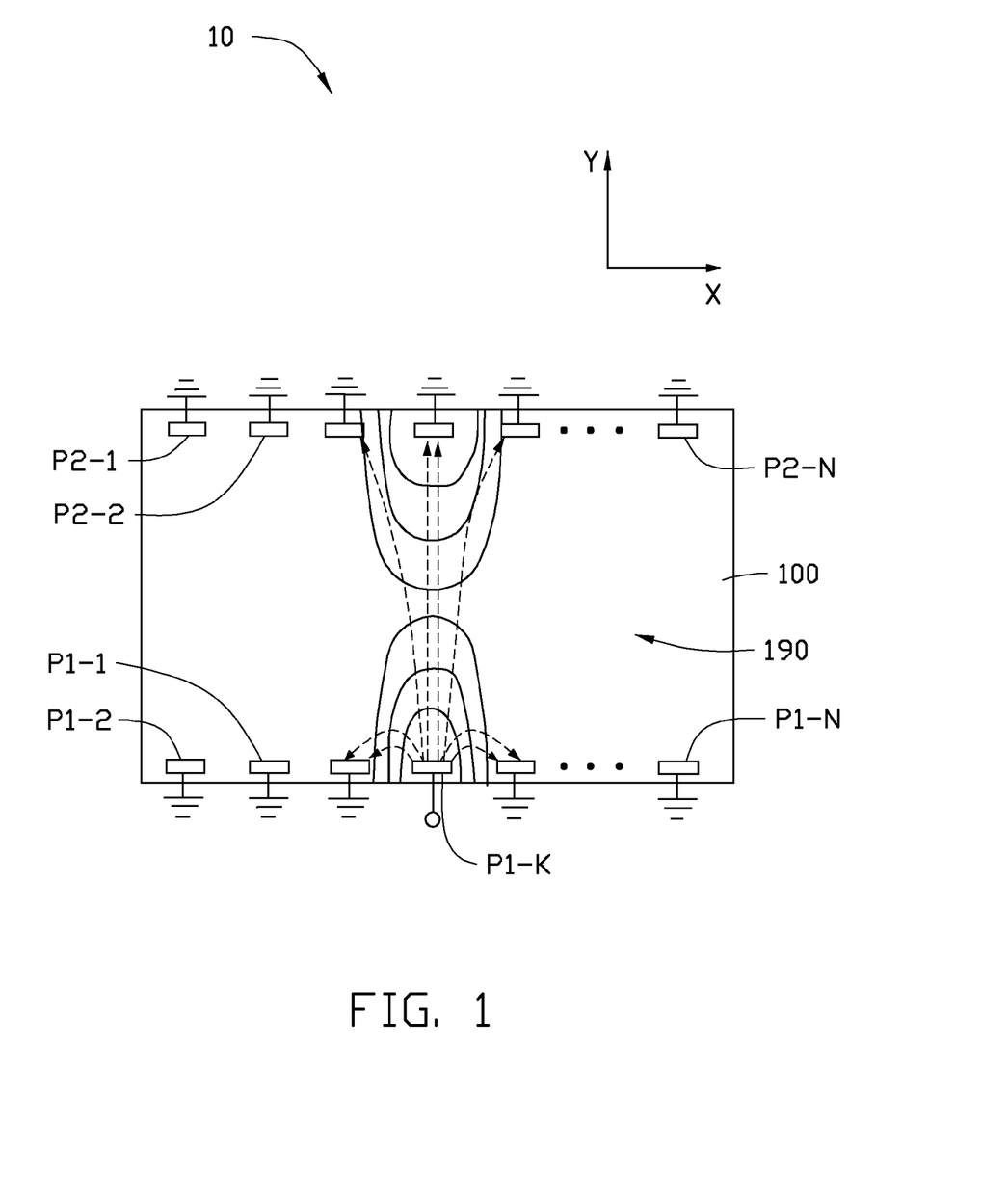
FIG. 1 is a schematic view of a method for determining touch point coordinates on a touch panel by single conductive driving terminal.

Referring to FIG. 1, one embodiment of a touch panel 10 includes a transparent conductive layer 100 on a substrate (not shown). The transparent conductive layer 100 can be a layer having differing electrical impedances in different orientations.

In the present disclosure, different electrical impedances across different orientations is described as anisotropic (anisotropic impedance layer), meaning a structure having a relatively low impedance in direction D and a relatively high impedance in direction H on the same surface (e.g., the surface of the transparent conductive layer 100). Electrical conductivity of the anisotropic impedance layer in direction H is smaller than the electrical conductivity in other directions. The electrical conductivity of the anisotropic impedance layer in direction D is larger than the electrical conductivity of the anisotropic impedance layer in other directions. Direction H is different from the direction D. In one embodiment, the relatively high impedance direction H is perpendicular to the relatively low impedance direction D. The relatively high impedance direction H and the relatively low impedance direction D of the anisotropic impedance layer can be achieved by having a plurality of conductive belts having a low conductivity aligned along the relatively high impedance direction H and a plurality of conductive belts having a high conductivity aligned along the relatively low impedance direction D, and the plurality of conductive belts having the low conductivity and the plurality of conductive belts having the low conductivity are electrically connected with each other. In another embodiment, the relatively high impedance direction H and the relatively low impedance direction D of the anisotropic impedance layer can be achieved by having a carbon nanotube film comprising orderly arranged carbon nanotubes. The transparent conductive layer 100 can be a square shape having two sides perpendicular to the relatively high impedance direction H and two sides perpendicular to the relatively low impedance direction D.

The relative low impedance direction D can be defined as a second direction, such as a Y direction. The relative high impedance direction H can be defined as a first direction, such as an X direction. The first direction can be perpendicular with the second direction.

In some embodiments, the transparent conductive layer 100 includes a carbon nanotube layer having anisotropic electrical conductivity. Carbon nanotubes of the carbon nanotube layer can be substantially arranged along the second direction, so that the first carbon nanotube layer has a greater electrical conductivity in the second direction than in other directions. Carbon nanotubes of the carbon nanotube layer can be substantially arranged along the first direction, so that the second carbon nanotube layer has a greater electrical conductivity in the first direction than in other directions. In some embodiments, the second carbon nanotube layer can be or include at least one carbon nanotube drawn film.

A plurality of first conductive terminals P1 listed from P1-1 to P1-N is spaced from each other and arranged in a row along the X direction. More specifically, the plurality of first conductive terminals P1 is arranged on a side of the transparent conductive layer 100. A signal input by each first electrode P1 to the transparent conductive layer 100, or received from the transparent conductive layer 100, will be transmitted mostly along the Y direction.

A plurality of second conductive terminals P2 listed from P2-1 to P2-N is spaced from each other and arranged in a row along the X direction. The plurality of second conductive terminals P2 is located on the opposite side of the transparent conductive layer 100 and thus opposite to the plurality of first conductive terminals P1. The transparent conductive layer 100 between the plurality of first conductive terminals P1 and the plurality of second conductive terminals P2 is hereinafter referred to as touch region 190.

During the process of electrically driving one of the plurality of first conductive terminals P1, for example, the first conductive terminal P1-K, will be firstly charged and then discharged. The rest of first conductive terminals P1 can be grounded, connected to a lower potential, or floating. As the first conductive terminal P1-K is fully charged, the current will flow from the first conductive terminal P1-K to the opposite second conductive terminal P2-K. However, due to the conductive nature of the transparent conductive layer 100 along X direction, a leakage current will flow from the first conductive terminal P1-K to the adjacent first conductive terminals P1 such as P1-(K−1) or P1-(K+1), and to the second conductive terminals P2 adjacent to the second conductive terminals P2-K.

Figure 2A:
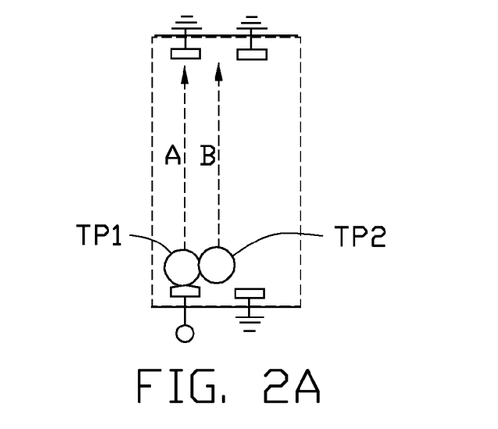
FIG. 2A is a schematic view of moving paths of two touch points where the two touch points move along the same Y coordinate but different X coordinates in the touch panel of FIG. 1.

When a fingertip contacts the region near P1-K, the capacity of the P1-K changes and becomes different compared to other conductive terminals. By scanning the respective capacities of the conductive terminals, the identify of the particular conductive terminals can be established, thus the touch point can be detected by detecting the signal strength of the first conductive terminal P1-K during the process of discharging. The signal strength of the first conductive terminal P1-K can be detected through a capacitance-to-digital converter. Referring to FIG. 2A, a first touch point TP1 moves along the path A from the first conductive terminal P1-K to the second conductive terminal P2-K. The relationship between the signal strength detected from the first conductive terminal P1-K and the movement of the first touch point TP1 is shown as curve SA in FIG. 2B. A second touch point TP2 moves along the path B, and the path B is parallel with and adjacent to path A. The relationship between the signal strength detected from the first conductive terminal P1-K and the movement of the second touch point TP2 is shown as curve SB in FIG. 2B.

Figure 2B:
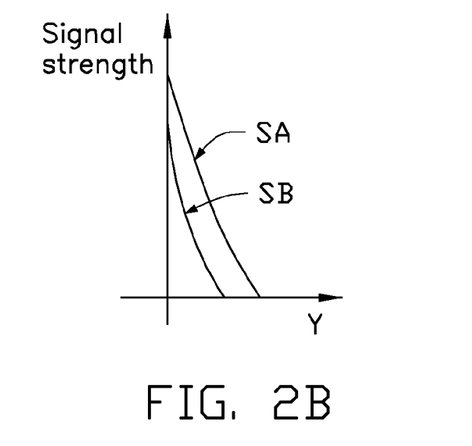
FIG. 2B shows a relationship between the signal strength and the movement of the two touch points along the Y direction in the touch panel of FIG. 2A.
Figure 2C:
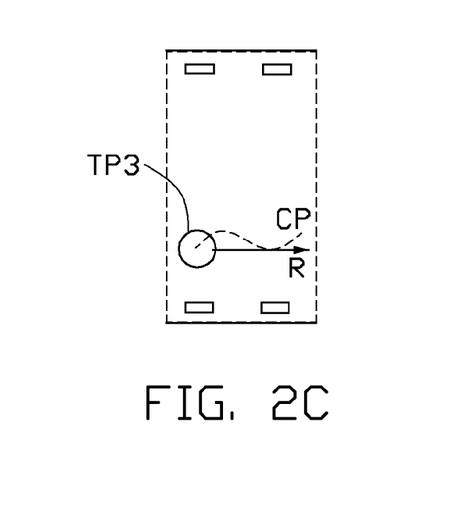
FIG. 2C shows the difference between an actual moving path and a calculated moving path of a touch point.

Comparing curve SB with curve SA, the nearer the touch point is to the first conductive terminal P1-K, the stronger the signal strength detected by the first conductive terminal P1-K. However, because the first touch point TP1 and the second touch point TP2 have different X coordinates, the first touch point TP1 and the second touch point TP2 have different Y coordinates at one signal strength. Therefore, the method for determining touch point coordinates on a touch panel 10 by electrically driving a single conductive terminal P1-K is not precise. Referring to FIG. 2C, while a third touch point TP3 moves along the solid line R, however, the movement of the third touch point TP3 detected by the first conductive terminal P1-K moves along the dotted line CP.

Figure 3A:
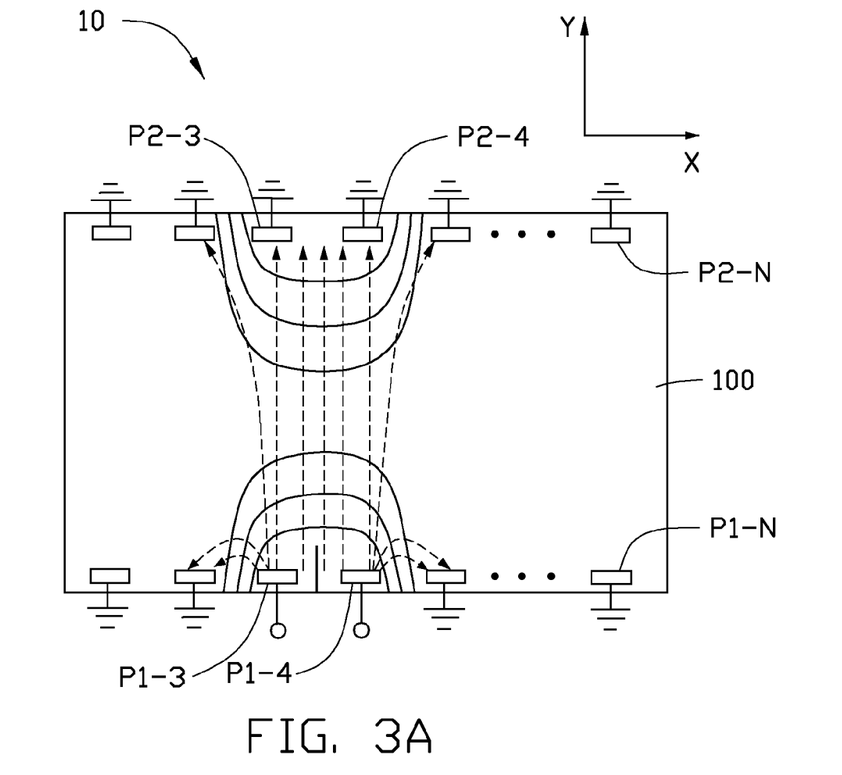
FIG. 3A is a schematic view of a embodiment of driving at least two conductive terminals of the touch panel.

Referring to FIG. 3A, in one embodiment, the first conductive terminal P1-3 and the first conductive terminal P1-4 are both driven and detected. When an electric field is formed between the first conductive terminals P1 and the second conductive terminals P2, some points in the electric field will have the same electric potential, and a line can be drawn connecting these points (equipotential line). A plurality of equipotential lines is formed between the touch region defined by the first conductive terminal P1-3, the first conductive terminal P1-4, the second conductive terminal P2-3, and the second conductive terminal P2-4. The plurality of equipotential lines forms a plurality of gradients along Y direction.

Figure 3B:
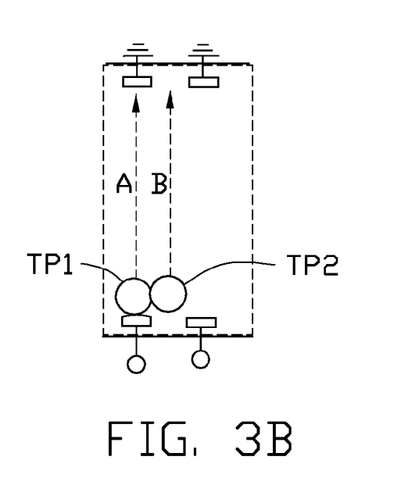
FIG. 3B is a schematic view of moving paths of two touch points, and the two touch points moves along the same Y coordinate and different X coordinates in the touch panel of FIG. 3A.
Figure 3C:
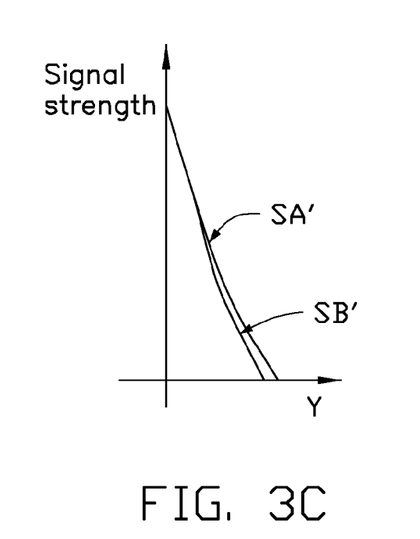
FIG. 3C shows a relationship between signal strengths and movements of the touch point along the Y direction in the touch panel of FIG. 3A.

Referring to FIG. 3B, the first touch point TP1 and the second touch point TP2 are moving along the path A and path B. FIG. 3C shows the relationship between the signal strength and the movement of the touch points. The signal strength is detected through the first conductive terminal P1-3 and the second conductive terminal P1-4, and the first touch point TP1 and second touch point TP2 move along Y direction. The coordinate of the first conductive terminals P1 is defined as "0", and the coordinate of the second conductive terminals P2 is defined as a nonzero integer. As a result, the first touch point TP1 moves along the curve SA', and the second touch point TP2 moves along the curve SB'. As the first touch point TP1 and the second touch point TP2 near the first conductive terminals P1, the curve SA' and the curve SB' can overlap. As the first touch point TP1 and the second touch point TP2 move away from the first conductive terminals P1, the curve SA' diverges strongly from the curve SB'. However, the difference between the curves SA' and SB' is smaller than the difference between curves SA and SB shown in FIG. 2B.

Thus as the second conductive terminal P2-3 and the second conductive terminal P2-4 are driven, the relationship between the signal strength and the movement of the first touch point TP1 and second touch point TP2 will be same as the relationship shown in FIG. 3C. The signal strength is detected through the second conductive terminal P2-3 and the second conductive terminal P2-4, and the nearer the touch points are to the second conductive terminals P2, the smaller will be the difference between the curve SA' and the curve SB'.

Figure 4:
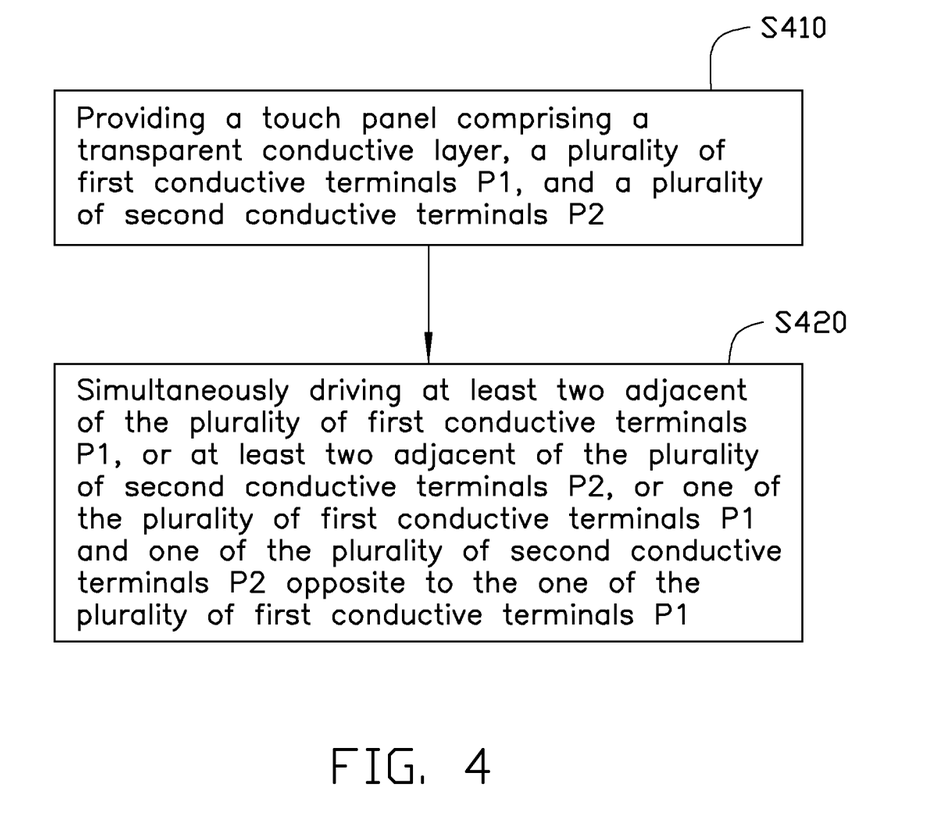
FIG. 4 shows a flowchart of one embodiment of a driving method of the touch panel.

Referring to FIG. 4, the Y coordinate can be obtained by following steps:

S410, providing a touch panel 10 with an anisotropic impedance layer, and a plurality of first conductive terminals P1 and a plurality of opposite second conductive terminals P2 which are electrically connected to the transparent conductive layer 100;

S420, simultaneously driving at least two adjacent conductive terminals or at lease two opposite conductive terminals or a combination, wherein the combination comprises at least two adjacent first conductive terminals P1 and at least two adjacent second conductive terminals P2 opposite to the two adjacent first conductive terminals P1.

Figure 5A:
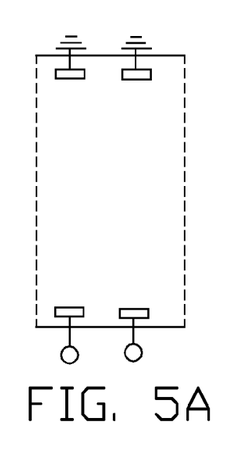
FIG. 5A shows a schematic view of one embodiment of driving at least two first conductive terminals.
Figure 5B:
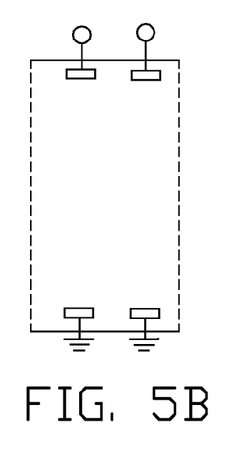
FIG. 5B shows a schematic view of one embodiment of driving at least two second conductive terminals.
Figure 5C:
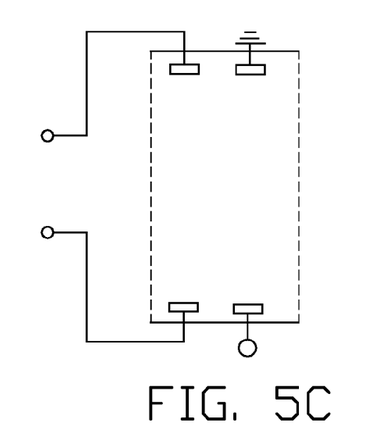
FIG. 5C shows a schematic view of one embodiment of driving a first conductive terminal and a second conductive terminal.
Figure 5D:
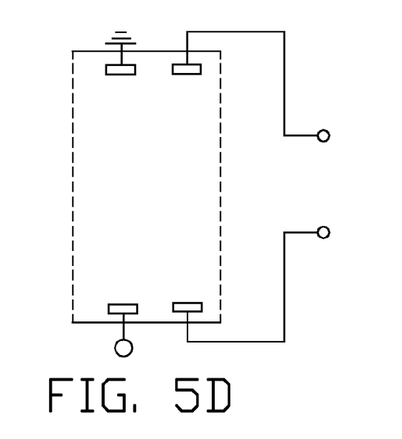
FIG. 5D shows a schematic view of another embodiment of driving a first conductive terminal and a second conductive terminal.
Figure 5E:
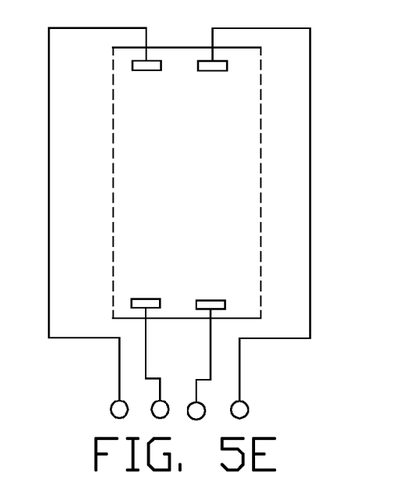
FIG. 5E shown a schematic view of one embodiment of driving at least two first conductive terminals and at least two second conductive terminals.

In step S420, the touch panel 10 can be driven in several ways. Referring to FIG. 5A, for example, a first combination comprises two adjacent first conductive terminals P1 which are driven at the same time. Referring to FIG. 5B, a second combination comprises two adjacent second conductive terminals P2 which are driven at the same time. Referring to FIG. 5E, a third combination includes two adjacent first conductive terminals P1 and two adjacent second conductive terminals P2, opposite to the two adjacent first conductive terminals P1, which are driven at the same time. Referring to FIG. 5C, a fourth combination includes one of the first conductive terminals P1 and one of second conductive terminals P2 opposite to the first conductive terminal P1 which are driven at the same time. Referring to FIG. 5D, a fifth combination includes one of the first conductive terminals P1 and one of the second conductive terminals P2 opposite to the first conductive terminal P1 which are driven at the same time. In one embodiment, the touch panel 10 is firstly driven according to FIG. 5E, and then the touch panel 10 can be driven in accordance with one of the ways shown in FIGS. 5A-5D. The plurality of first conductive terminals P1 and the plurality of second conductive terminals P2 can be driven through a driving circuit (not shown). The signal strengths of the touch point can be detected in the discharging process. The plurality of first conductive terminals P1 and the plurality of second conductive terminals P2 can be discharged at the same time. The X coordinate and the Y coordinate of the touch point can be calculated through the signal strengths.

Figure 6:
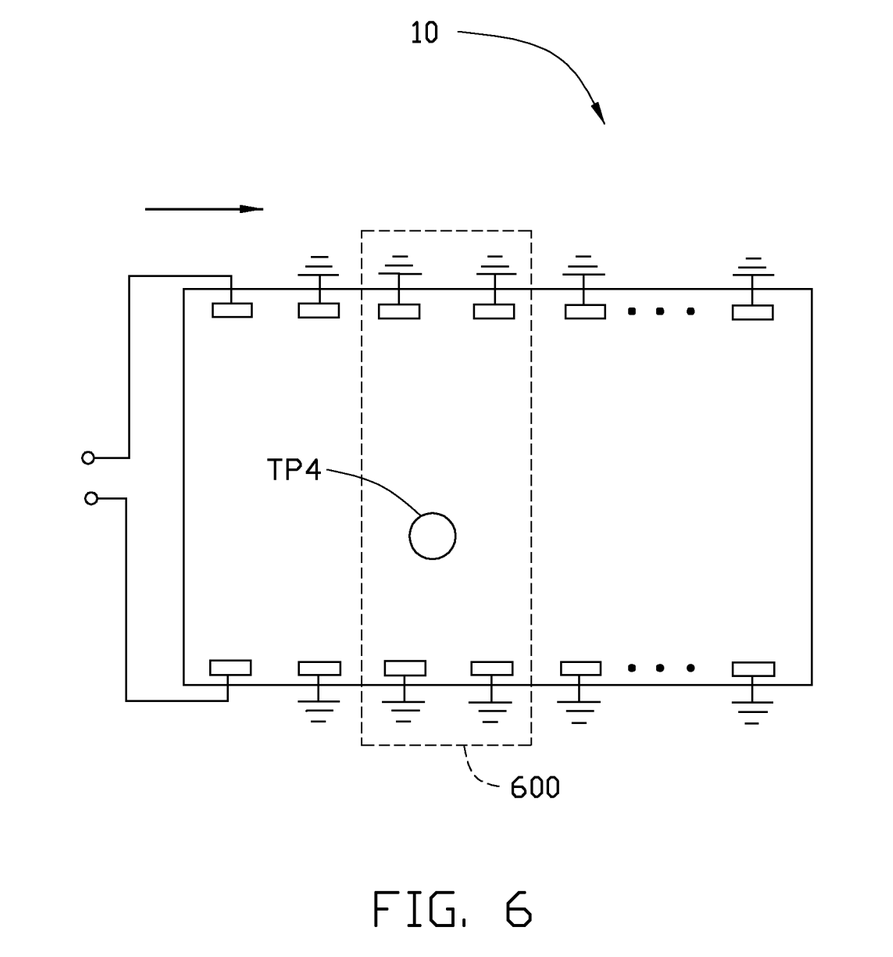
FIG. 6 shows a flowchart of another embodiment of a driving method of the touch panel.

Referring to FIG. 6, one embodiment of a method for driving touch panel 10 includes following steps:

S610, obtaining the X coordinate of touch point TP4 by scanning the plurality of first conductive terminals P1 and the plurality of second conductive terminals P2 according to the method shown in FIG. 5C or FIG. 5D; and S620, obtaining the Y coordinate of the touch point TP4 via the method shown in FIG. 5A, or FIG. 5B, or FIG. 5E.

Figure 7A:
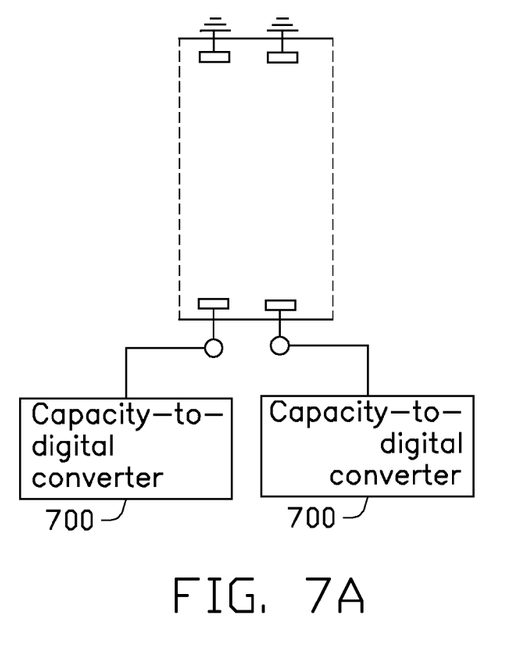
FIG. 7A is a schematic view of one embodiment of a method to determine the signal strength of the first conductive terminals.
Figure 7B:
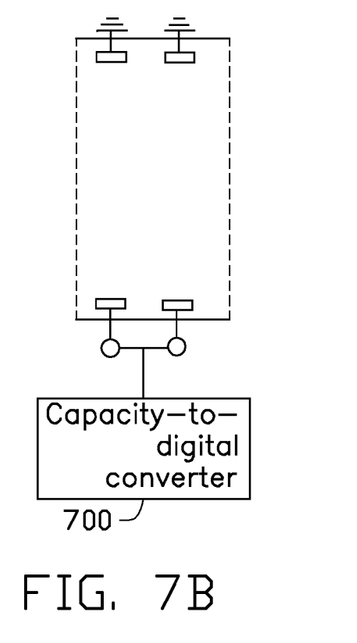
FIG. 7B is a schematic view of another embodiment of a method to determine the signal strength of the first conductive terminals.
Figure 7C:
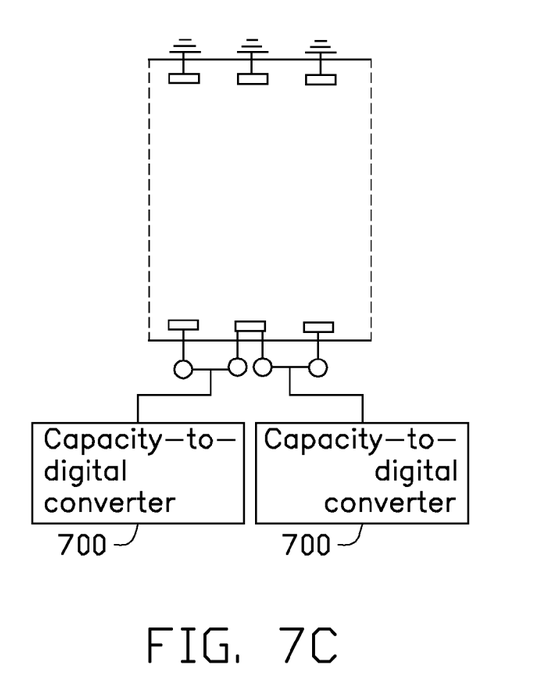
FIG. 7C is a schematic view of another embodiment of a method to determine the signal strength of the first conductive terminals.

In step S620, the Y coordinate of the touch point TP4 can be obtained through the method of FIG. 5A or FIG. 5B. Referring to FIG. 7A, in one embodiment, two capacity-to-digital converters 700 are electrically connected to the two first conductive terminals P1 in the touch region 600. The two capacity-to-digital converters 700 detect the signal strengths of the two first conductive terminals P1 at the same time. Referring to FIG. 7B, in another embodiment, the two first conductive terminals P1 are coupled together and electrically connected to a single capacity-to-digital converter 700. The single capacity-to-digital converter 700 detects the coupled signal strength of the two first conductive terminals P1. Referring to FIG. 7C, in another embodiment, the three first conductive terminals P1 are electrically connected to two capacity-to-digital converters 700. Each two adjacent first conductive terminals P1 are coupled together and electrically connected to one capacity-to-digital converter 700. The signal strength of the three first conductive terminals P1 can be obtained through the two capacity-to-digital converters 700.

Figure 8:
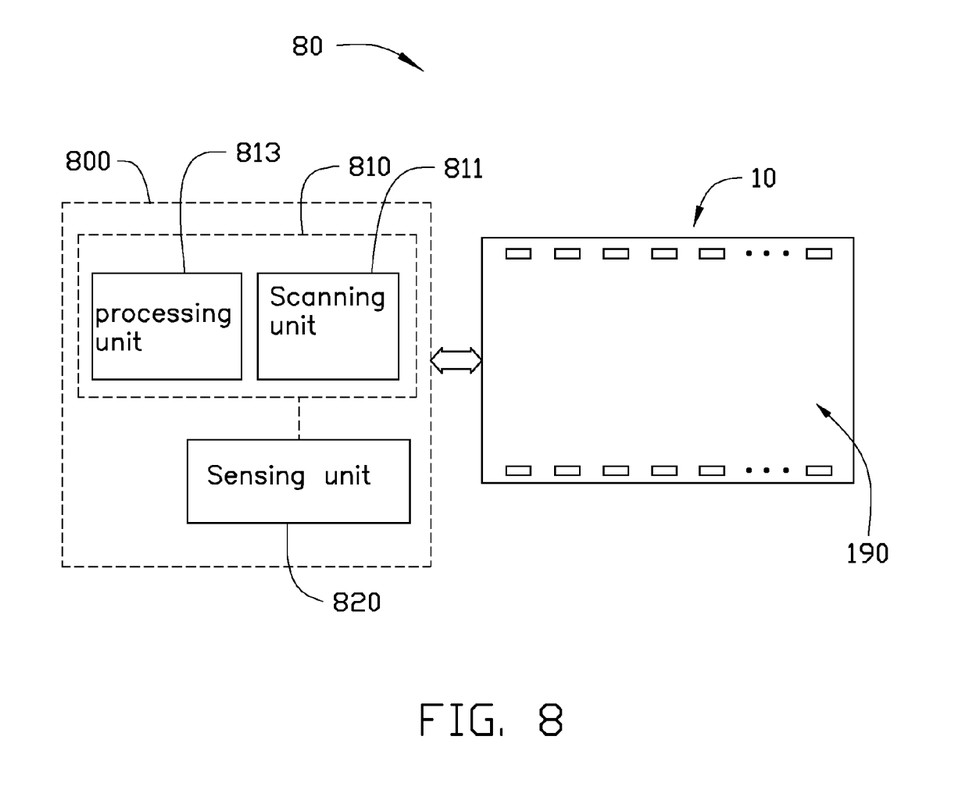
FIG. 8 shows a schematic diagram of one embodiment of a touch panel module.

Referring to FIG. 8, a touch panel module 80 includes a touch panel 10 and a driving module 800. The plurality of first conductive terminals P1 and the plurality of second conductive terminals P2 are electrically coupled to the driving module 800. The driving module 800 includes a controlling unit 810 and a sensing unit 820. The controlling unit 810 drives the electrical supply to the touch panel 10. The controlling unit 810 includes a processing unit 813 and a scanning unit 811. The scanning unit 811 is configured to charge or discharge the touch panel 10. The sensing unit 820 detects the signal strength of the plurality of first conductive terminals P1 and the plurality of second conductive terminals P2. The coordinates of the touch point in touch region 190 can be obtained and output through the driving module 800.

Figure 9:
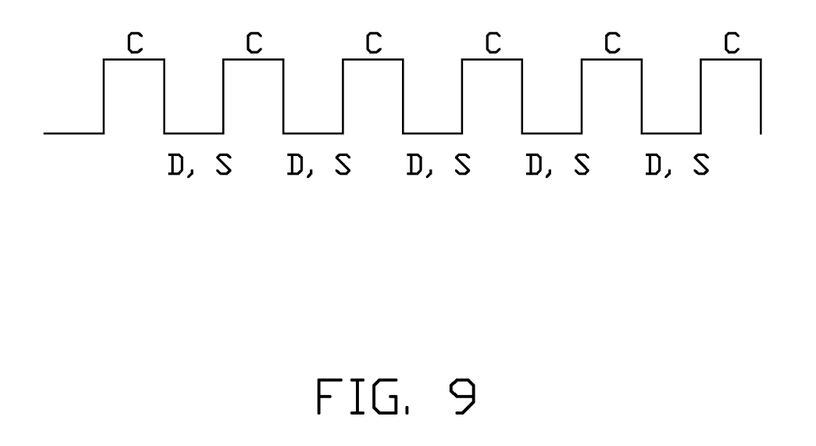
FIG. 9 is a schematic view of one embodiment of driving signals during the driving of the first conductive signals.

The touch point on the touch panel module 80 can be detected according to the method shown in any of FIGS. 5A-5E, or in FIG. 6. Referring to FIG. 9, in one embodiment, the touch panel 10 is driven by the scanning unit 811 and detected by the sensing unit 820. The charging phase is shown as "C", and the discharging phase is shown as "D." During the discharging phase, the sensing of the signal strength is performed and defined as "S". The sensing units 820 can be the capacity-to-digital converters 700 shown in FIG. 7A, FIG. 7B, or FIG. 7C. The touch point can be calculated by the processing unit 813 through the capacity-to-digital converters 700.

Furthermore, the driving module 800, the controlling unit 810, and the processing unit 813 can include integrated circuits, such as microcontrollers, microprocessors, digital signal processors, Application Specific Integrated Circuit (ASIC), Field Programmable Gate Array (FPGA), or implemented by a logic circuit.

Figure 10:
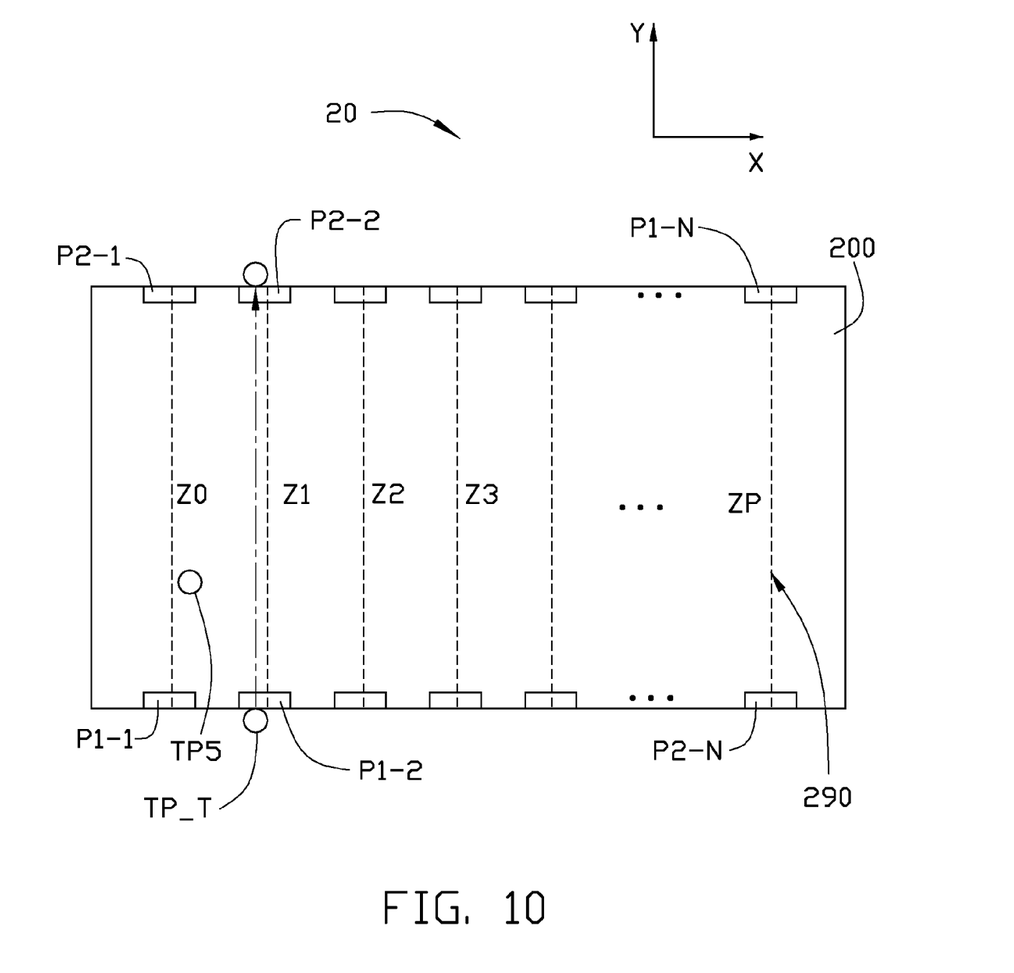
FIG. 10 shows a flowchart of one embodiment of a method to determine touch point positions.
Figure 11:
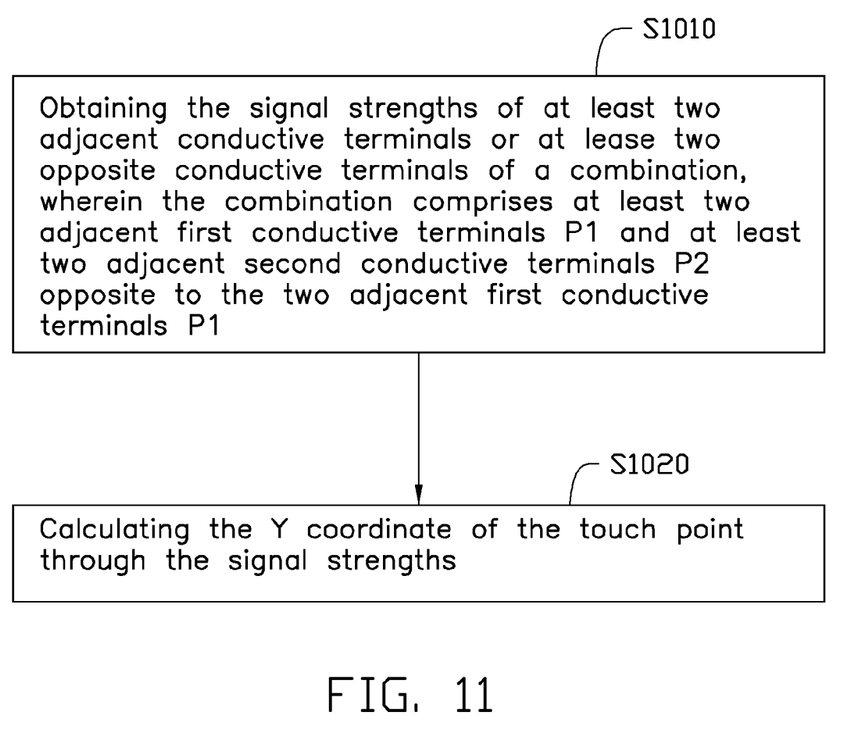
FIG. 11 shows a schematic view of one embodiment of a method to determine the touch point position.

Referring to FIGS. 10-11, a touch panel 20 with touch regions 290 is provided. The structure of touch panel 20 is similar to the touch panel 10. In a touch region 290, at least two adjacent first conductive terminals P1 and the opposite at least two adjacent second conductive terminals P2 are configured as one unit for detection purposes (detecting unit). In one embodiment, a detecting unit Z0 is defined by the first conductive terminal P1-1, the first conductive terminal P1-2, the second conductive terminal P2-1, and the second conductive terminal P2-1. One detecting unit comprises at least four conductive terminals, thus the number of detecting units is fewer than the number of conductive terminals. A plurality of detecting units from Z0 to ZP can be deduced, where 0<P<N. The touch point can be established by following steps:

S1010, obtaining the signal strengths of at least two adjacent conductive terminals or at least two opposite conductive terminals of a combination, wherein the combination comprises at least two adjacent first conductive terminals P1 and at least two adjacent second conductive terminals P2 opposite to the two adjacent first conductive terminals P1; and S1020, calculating the Y coordinate of the touch point through the signal strengths.

In the step S1010, the signal strengths are obtained by simultaneously driving and simultaneously sensing the at least two adjacent conductive terminals or the at least two opposite conductive terminals of the combination.

The Y coordination of touch point TP5 can be calculated by detecting the first signal strengths (VA1) of the first conductive terminal P1-1 and the first conductive terminal P1-2, and the second signal strengths (VA2) of the second conductive terminal P2-1 and the second conductive terminal P2-2.

Figure 12:
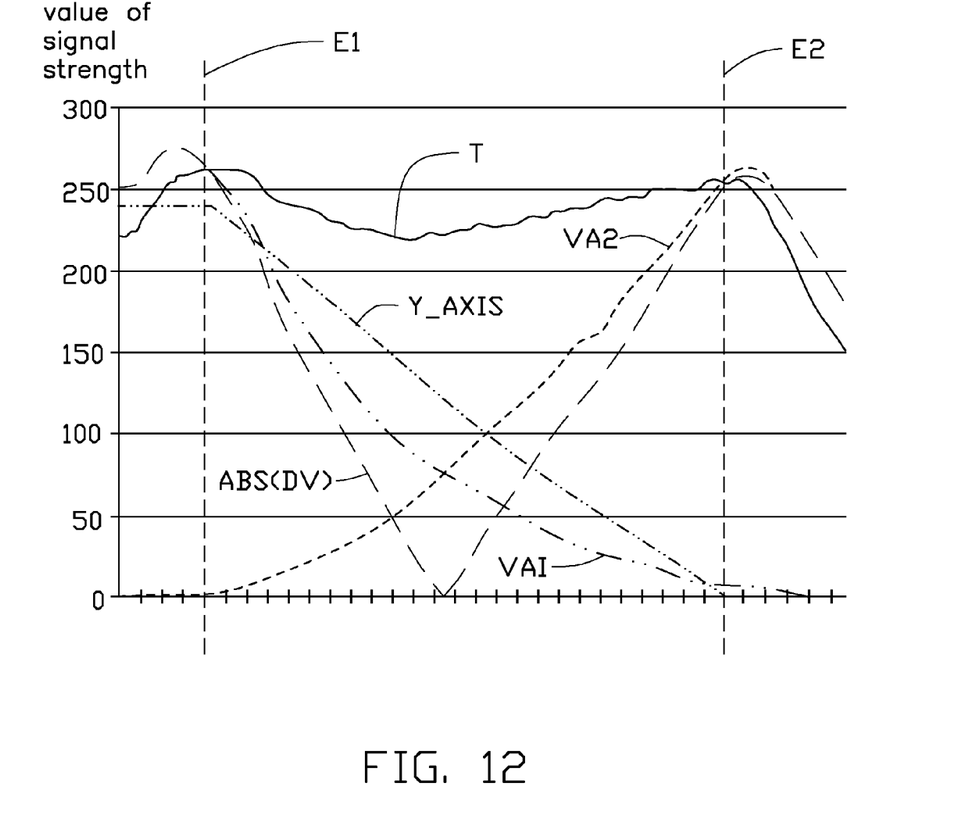
FIG. 12 shows a diagram of a relationship between the signal strength and the movement of the touch point TP_T moving from the first conductive terminal to the second conductive terminal.

In FIG. 10, the touch point TP_T moves from the first conductive terminal P1-2 to the second conductive terminal P2-2 along the Y coordinate with a constant speed. Referring to FIG. 12, the first signal strengths (VA1) gradually reduce from the first conductive terminal P1-2 to the second conductive terminal P2-2 during the movement of TP_T. However, the second signal strengths (VA2) gradually increase from the first conductive terminal P1-2 to the second conductive terminal P2-2. The difference DV between the first signal strengths (VA1) and the second signal strength (VA2) is linear. The absolute difference ABS(DV) between the first strength (VA1) and the second signal strength (VA2) is shown in FIG. 12. When the touch point TP_P is located midway between the first conductive terminal P1-2 and the second conductive terminal P2-2, the ABS(DV) will be zero.

Therefore, the Y coordinate of the touch point TP_T can be obtained based on the difference DV. When DV=VA1−VA2, the Y coordinate ranges from about +270 to about −260 from the first conductive terminal P1-2 to the second conductive terminal P2-2. In contrast, when DV=VA2−VA1, the Y coordinate ranges from about −270 to about +260. Furthermore, the dotted line E1 and dotted line E2 represent boundaries of the touch region 290. The VA1 and VA2 will be non-linear in the regions outside the boundaries.

In one embodiment, the Y coordinate can be obtained through a normalization method. The touch panel 20 is driven according to the third combination. The at least two first conductive terminals P1 and at least two second terminals P2 opposite to the at least two first conductive terminals P1 can be driven at the same time. Both the at least two first conductive terminals P1 and the at least two second conductive terminals P2 will be charged and discharged, and the signal strength of each of them will be detected during the discharging process. A third signal strength of the at least two first conductive terminals P1 and the at least tow second conductive terminals P2 is defined as T. The third signal strength T is constant in theory. However, due to the resistance of the touch panel 20, the third signal strength T in the middle of touch panel 20 is smaller that of the third signal strength T on the boundary. The Y coordinate can be calculated through the first signal strength VA1, the second signal strength VA2, and the third signal strength T. The Y coordinate can be calculated through one of following formulas:

$$Y=(VA1-VA2)/T; \qquad \text{Formula I}$$

$$Y=(VA2-VA1)/T; \qquad \text{Formula II}$$

$$Y=(T-(VA1-VA2))/T. \qquad \text{Formula III}$$

Thus the Y coordinate can range from about 1 to −1, −1 to 1, or 0 to 2.

In another embodiment, the Y coordinate can also be obtained through the formulas listed above and the resolution Y_res of the touch panel along the Y direction (such as 480, 600). Taking the above formula III for instance, the Y coordinate can be calculated as follows:

$$Y=(T-(VA1-VA2))/T*Y\_res/2. \qquad \text{Formula IV}$$

The Y coordinate ranges from about 0 to Y_res.

Furthermore, because the third signal strength T obtained through the third combination is not constant in practice, the third signal strength T can be obtained through other combinations such as the fourth combination shown in FIG. 5C and the fifth combination shown in FIG. 5D. In the fourth combination, the signal strength of the first conductive terminal P1 and the second conductive terminal P2 is defined as a fourth signal strength VA4. In the fifth combination, the signal strength of the first conductive terminal P1 and the second conductive terminal P2 is defined as a fifth signal strength VA5. Thus the third signal strength T can be substituted for T', where T'=(T+VA4+VA5). Thus the Y coordinate can be obtained by:

$$Y=(T-(VA1-VA2))/T'*Y\_res/2. \qquad \text{Formula V}$$

Furthermore, the X coordinate can also be calculated by one of formulas:

$$X=(T-(VA4-VA5))/T; \qquad \text{Formula VI}$$

$$X=(T-(VA4-VA5))/T*X\_ZONE\_res/2, \qquad \text{Formula VII}$$

wherein the X_ZONE_res is the resolution in the detecting unit Z0 along the X direction.

Thus the X coordinate in the detection unit Z0 ranges from about 0 to X_ZONE_res. Furthermore, the X_ZONE_res can be calculated through the resolution X—_res of the touch region 290 (such as 1024, 800) divided by the number of detecting units num_total_zone.

Furthermore, the third signal strength T can also be substituted for T'', where T''=(T+VA1+VA2). Thus the X coordinate can be calculated by following formula:

$$X=(T''-(VA4-VA5))/T''*X\_ZONE\_res/2. \qquad \text{Formula VIII}$$

Figure 13:
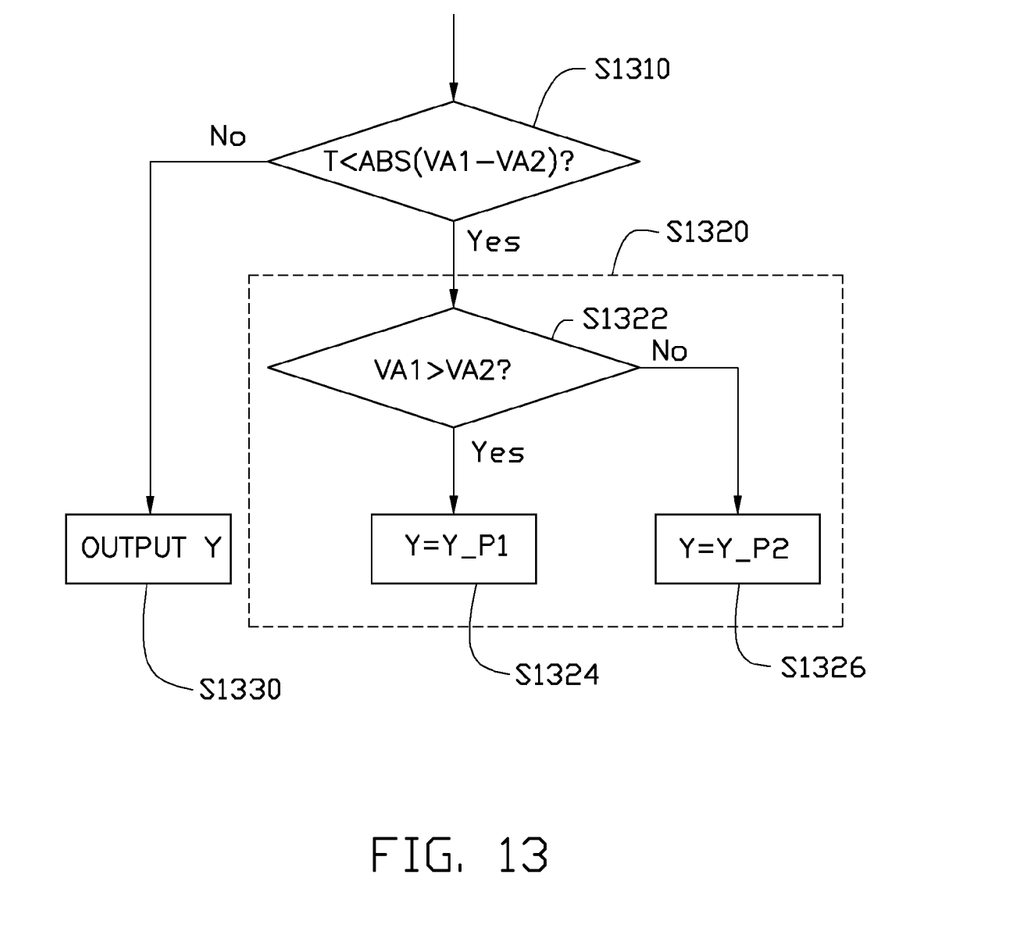
FIG. 13 shows a diagram of one embodiment of a method to determine the touch point position.

Furthermore, the third signal strength T can also be calculated through the first combination and the second combination. The X coordinate can be obtained by scanning the plurality of first conductive terminals P1 and the plurality of second conductive terminals P2, and the adjacent two first conductive terminals P1 and the adjacent two second conductive terminals P2 nearest the touch point can be obtained, by virtue of the different capacity of a single, touched, conductive terminal compared to the capacities of the other conductive terminals, or the different capacity of more than one conductive terminal in the event that a touch occurs between two or more conductive terminals Referring to FIGS. 12-13, while the VA1 and VA2 are non-linear in the region outside the boundaries, the Y coordinate can be obtained by following steps:

S1310, comparing the third signal strength T with the absolute difference ABS(VA1−VA2);

S1320, if the third signal strength T is smaller that the absolute difference ABS(VA1−VA2), obtaining the Y coordinate by comparing the first signal strength VA1 and the second signal strength VA2;

S1330, if the third signal strength T is greater than or equal to the absolute difference ABS(VA1−VA2), obtaining the Y coordinate by one of the Formulas I-V.

In step S1320, the Y coordinate is obtained by following steps:

S1322, comparing the first signal strength VA1 with the second signal strength VA2;

S1324, if the first signal strength VA1 is greater than the second signal strength VA2, the Y coordinate of the touch point TP_T is equal to the Y coordinate of the first conductive terminal P1 (Y_P1), that is Y=Y_P1. In one embodiment, Y_P1 is defined as zero, thus Y=0.

S1326, if the first signal strength VA1 is smaller than or equal to the second signal strength VA2, the Y coordinate is the touch point TP_T equal to the Y coordinate of the second conductive terminal P2 (Y_P2), that is, Y=Y_P2. In one embodiment, Y_P2 is defined as Y_MAX, thus Y=Y_MAX.

In another embodiment, Y_P1 can be defined as Y_MAX, and Y_P2 can be defined as zero. The Y coordinate of the touch point TP_T is shown as Y_AXIS, and the Y_AXIS is linear between the boundary of the touch region 290, and the Y_AXIS is constant when the touch point TP_T is outside the boundaries.

The method and the apparatus for determining a touch point has following advantages. By simultaneously driving at least two conductive terminals, the plurality of equipotential lines can be uniformly formed along the X direction and the Y direction, thus the resolution of the coordinate of the touch point can be improved. Furthermore, the detecting resolution of detecting the touch point can also be improved.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for determining touch point coordinates on a touch panel comprising:

providing a touch panel comprising a transparent conductive layer, a plurality of first conductive terminals P1, and a plurality of second conductive terminals P2, wherein the transparent conductive layer has a first impedance along a first direction X, and has a second impedance along a second direction Y, the first impedance is higher than the second impedance, and the first direction X intersects with the second direction Y; the plurality of first conductive terminals P1 is electrically connected to the transparent conductive layer, spaced with each other, and arranged along the first direction X; and the plurality of second conductive terminals P2 is opposite to the plurality of first conductive terminals P1, electrically connected to the transparent conductive layer, spaced with each other, and arranged along the X direction; a touch region is defined between the plurality of first conductive terminals P1 and the plurality of second conductive terminals P2;

simultaneously driving at least adjacent two of the plurality of first conductive terminals P1;

simultaneously driving at least adjacent two of the plurality of second conductive terminals P2; and simultaneously driving adjacent two of the plurality of first conductive terminals P1 and opposite two of the plurality of second conductive terminals P2;

detecting and registering a first strength value VA1 by simultaneously discharging the at least two adjacent of the plurality of first conductive terminals P1;

detecting and registering a second strength value VA2 by simultaneously discharging the at least two adjacent of the plurality of second conductive terminals P2;

detecting and registering a third strength value T by simultaneously discharging the adjacent two of the plurality of first conductive terminals P1 and the opposite two of the plurality of second conductive terminals P2;

and obtaining at least an X coordinate along the first direction X and an Y coordinate along the second direction Y by comparing the first strength value VA1, the second strength value VA2, the third strength value T; wherein the Y coordinate is obtained by a formula as follows:

$$Y=((T-(VA1-VA2))/T)*Y\_res/2, \quad \text{Formula IV:}$$

wherein the Y_res is a resolution of the touch panel along the second direction Y.

2. The method of claim 1, further comprising detecting and registering a fourth strength value VA4 of a signal created under a fourth combination; a fifth strength value VA5 of a signal created under the fifth combination; wherein one of the first conductive terminals P1 and opposite one of the second conductive terminals P2 are driven at the same time is defined as the fourth combination; one of the first conductive terminals P1 and opposite one of the second conductive terminals P2 adjacent to the fourth combination are driven at the same time is defined as the fifth combination.

3. The method of claim 2, wherein the Y coordinate is obtained by a formula as follows:

$$Y=((T'-(VA1-VA2))/T')*Y\_res/2, \quad \text{Formula V:}$$

wherein T'=(T+VA4+VA5).

4. The method of claim 2, wherein the X coordinate is obtained by a formula as follows:

$$X=(T-(VA4-VA5))/T. \quad \text{Formula VI:}$$

5. The method of claim 2, wherein the X coordinate is obtained by a formula as follows:

$$X=((T-(VA4-VA5))/T)*X\_ZONE\_res/2, \quad \text{Formula VII:}$$

wherein the X_ZONE_res is a resolution in the touch region along the first direction X.

6. The method of claim 2, wherein the X coordinate is obtained by a formula as follows:

$$X=(T'-(VA4-VA5))/T''*X\_ZONE\_res/2, \quad \text{Formula VIII:}$$

wherein T''=(T+VA1+VA2).

7. The method of claim 1, wherein the Y coordinate adjacent to a boundary of the touch region is obtained by steps as follows:

comparing the third strength value T with an absolute difference between the first strength value VA1 and the second strength value VA2, ABS(VA1−VA2);

obtaining the Y coordinate by comparing the first strength value VA1 and the second strength value VA2 under the third strength value T is smaller than the absolute difference, ABS (VA1−VA2); or obtaining the Y coordinate by a formula selected from the group consisting of formulas as follows under the third strength value T is greater than or equal to the absolute difference, ABS (VA1−VA2):

$$Y=(VA1-VA2)/T; \quad \text{Formula I:}$$

$$Y=(VA2-VA1)/T; \quad \text{Formula II:}$$

$$Y=(T-(VA1-VA2))/T; \quad \text{Formula III:}$$

$$Y=((T-(VA1-VA2))/T)*Y\_res/2; \text{ and} \quad \text{Formula IV:}$$

$$Y=((T'-(VA1-VA2))/T')*Y\_res/2; \quad \text{Formula V:}$$

wherein T'=(T+VA4+VA5), the Y_res is a resolution of the touch panel along the second direction Y.

8. The method of claim 7, wherein the Y coordinate is obtained by comparing the first strength value VA1 with the second strength value VA2 by steps as follows:

the Y coordinate is equal to the Y coordinate of the first conductive terminal P1 if the first strength value VA1 is greater than the second strength value VA2; or the Y coordinate is equal to the Y coordinate of the second conductive terminal P2 if the first strength value VA1 is smaller than or equal to the second strength value VA2.

9. The method of claim 1, wherein the strength value is created by applying electrical currents to a plurality of capacity-to-digital converters electrically connected to the plurality of first conductive terminals P1 and the plurality of second conductive terminals P2.

10. The method of claim 9, wherein at least adjacent two of the plurality of first conductive terminals P1 are coupled together and electrically connected to one of the capacity-to-digital converters, and the capacity-to-digital converters are configured to detect the strength values of the signals of the adjacent two first conductive terminals P1 which are coupled together.

11. The method of claim 9, wherein three of the first conductive terminals P1 are electrically connected to two capacity-digital-converters, and adjacent first conductive terminals of the three first conductive terminals P1 are coupled together and electrically connected to one capacity-digital-converter.

12. A method for determining touch point coordinates on a touch panel comprising:

providing a touch panel comprising a transparent conductive layer, a plurality of first conductive terminals P1, and a plurality of second conductive terminals P2, wherein the transparent conductive layer has a first impedance along a first direction X, and has a second impedance along a second direction Y, the first impedance is higher than the second impedance, and the first direction X intersects with the second direction Y; the plurality of first conductive terminals P1 is electrically connected to the transparent conductive layer, spaced with each other, and arranged along the first direction X; and the plurality of second conductive terminals P2 is opposite to the plurality of first conductive terminals P1, electrically connected to the transparent conductive layer, spaced with each other, and arranged along the X direction; a touch region is defined between the plurality of first conductive terminals P1 and the plurality of second conductive terminals P2;

simultaneously driving at least adjacent two of the plurality of first conductive terminals P1, and detecting and registering a first strength value VA1 by simultaneously discharging the at least two adjacent of the plurality of first conductive terminals P1;

simultaneously driving at least adjacent two of the plurality of second conductive terminals P2, and detecting and registering a second strength value VA2 by simultaneously discharging the at least two adjacent of the plurality of second conductive terminals P2;

simultaneously driving adjacent two of the first conductive terminals P1 and opposite two of the second conductive terminals P2, and detecting and registering a third strength value T by simultaneously discharging the adjacent two of the first conductive terminals P1 and the opposite two of the second conductive terminals P2; and obtaining at least an X coordinate along the first direction X and an Y coordinate along the second direction Y by comparing the strengths of the signals, wherein the Y coordinate is obtained from a group consisting of formulas as follows:

$$Y=(VA1-VA2)/T; \qquad \text{Formula I:}$$

$$Y=(VA2-VA1)/T; \text{ and} \qquad \text{Formula II:}$$

$$Y=(T-(VA1-VA2))/T. \qquad \text{Formula III:}$$

* * * * *